United States Patent
Iizuka et al.

(10) Patent No.: US 11,359,117 B2
(45) Date of Patent: Jun. 14, 2022

(54) ADHESIVE RESIN COMPOSITION, METHOD FOR BONDING ADHERENDS, AND ADHESIVE RESIN FILM

(71) Applicant: FUJIMORI KOGYO CO., LTD., Tokyo (JP)

(72) Inventors: Hirokazu Iizuka, Tokyo (JP); Kunihiro Takei, Tokyo (JP); Yuiko Maruyama, Tokyo (JP); Yuki Sato, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 139 days.

(21) Appl. No.: 16/074,945

(22) PCT Filed: Dec. 12, 2016

(86) PCT No.: PCT/IB2016/001741
§ 371 (c)(1),
(2) Date: Aug. 2, 2018

(87) PCT Pub. No.: WO2017/137796
PCT Pub. Date: Aug. 17, 2017

(65) Prior Publication Data
US 2019/0031928 A1    Jan. 31, 2019

(30) Foreign Application Priority Data
Feb. 8, 2016 (JP) ............... JP2016-021940

(51) Int. Cl.
| | |
|---|---|
| B32B 7/12 | (2006.01) |
| C09J 123/26 | (2006.01) |
| C09J 7/20 | (2018.01) |
| C09J 163/04 | (2006.01) |
| C09J 151/06 | (2006.01) |
| C09J 7/30 | (2018.01) |
| B32B 37/12 | (2006.01) |
| B32B 38/00 | (2006.01) |

(52) U.S. Cl.
CPC ............ *C09J 123/26* (2013.01); *B32B 37/12* (2013.01); *B32B 38/0036* (2013.01); *C09J 7/20* (2018.01); *C09J 7/30* (2018.01); *C09J 151/06* (2013.01); *C09J 163/04* (2013.01); *C08L 2201/56* (2013.01)

(58) Field of Classification Search
None
See application file for complete search history.

(56) References Cited

U.S. PATENT DOCUMENTS

| | | | |
|---|---|---|---|
| 5,242,980 A | 9/1993 | Tse | |
| 6,558,797 B1 * | 5/2003 | Arata | ............. C09J 163/00 428/418 |
| 2015/0315400 A1 * | 11/2015 | Yano | .............. A43B 9/12 524/113 |
| 2016/0036013 A1 | 2/2016 | Nakazato et al. | |
| 2017/0088753 A1 | 3/2017 | Nakamura et al. | |
| 2017/0096586 A1 * | 4/2017 | Sakata | .............. B32B 15/08 |
| 2017/0297302 A1 * | 10/2017 | Okimura | ........... B32B 27/281 |
| 2021/0087438 A1 * | 3/2021 | Sugiki | ............ C09J 151/06 |

FOREIGN PATENT DOCUMENTS

| | | |
|---|---|---|
| CN | 106541641 A | 3/2017 |
| JP | H10-46122 A | 2/1998 |
| JP | H10-60401 A | 3/1998 |
| JP | 2003-272572 A | 9/2003 |
| JP | 2003261847 A | 9/2003 |
| JP | 2012001661 A | 1/2012 |
| JP | 2013091702 A | 5/2013 |
| JP | 2014218633 A | 11/2014 |
| JP | 5700166 B1 | 4/2015 |
| JP | 5875029 B1 | 3/2016 |
| WO | 2015190411 A1 | 12/2015 |
| WO | WO-2016047289 A1 * | 3/2016 ............ B32B 27/34 |

OTHER PUBLICATIONS

Masaharu, Ishiguro et al., "Adhesive Composition", English translation of JP 10-60401, Mar. 3, 1998 (Year: 1998).*
International Preliminary Report on Patentability dated Aug. 14, 2018 for PCT/IB2016/001741 and English translation thereof, 12 pgs.
Office Action for Japanese Patent Application No. 2016-021940 dated Jan. 21, 2020 and English translation thereof; 7 pgs.
Office Action for Chinese Patent Application No. 201680080833.0 dated Mar. 19, 2020 and English summary thereof; 5 pgs.
Office Action for Korean Patent Application No. 10-2018-7022352 dated Dec. 16, 2019 and English translation thereof; 14 pgs.

(Continued)

*Primary Examiner* — Anish P Desai
(74) *Attorney, Agent, or Firm* — Hauptman Ham, LLP

(57) ABSTRACT

The present invention provides an adhesive resin composition that has excellent adhesiveness and durability, a method for bonding adherends, and an adhesive resin film More specifically, the present invention relates to an adhesive resin composition containing more than 50 parts by mass and 99.5 parts by mass or less in a solid content of an acid-modified polyolefin resin having a melting point of 50 to 100° C., 0.5 parts by mass or more and less than 50 parts by mass in a solid content of an epoxy resin having a novolac structure, and an organic solvent; a method for bonding adherends including forming an adhesive layer on a first adherend by applying the adhesive resin composition and drying, and then bonding a second adherend to the adhesive layer by laminating the second adherend on the adhesive layer; and an adhesive resin film including a first adhesive layer, a substrate layer, and a second adhesive layer in that order, in which any one or both of the first adhesive layer and the second adhesive layer include(s) the adhesive resin composition.

4 Claims, 1 Drawing Sheet

(56) References Cited

OTHER PUBLICATIONS

Extended European Search Report for European Patent Application No. 16889727.0 dated Aug. 13, 2019; 7 pgs.
Office Action for Chinese Patent Application No. 201680080833.0 dated Sep. 2, 2019 and English translation thereof; 9 pgs.
ISR for PCT/IB2016/001741 dated Mar. 14, 2017, 4 pp.
Notice of Allowance for Korean Patent Application No. 10-2018-7022352 dated Jun. 25, 2020 and English translation thereof; 2 pgs.
Notice of Allowance for Chinese Patent Application No. 201680080833.0 dated Jun. 4, 2020 and English translation thereof; 3 pgs.
Office Action for Taiwanese Patent Application No. 105140367 dated Jun. 5, 2020 and English summary thereof; 6 pgs.
Office Action for Japanese Patent Application No. 2016-021940 dated Oct. 20, 2020 and English translation thereof; 7 pgs.
Notice of Allowance for Taiwanese Patent Application No. 105140367 dated Nov. 16, 2020 and English summary thereof; 3 pgs.
Office Action for Korean Patent Application No. 10-2020-7027229 dated Nov. 17, 2020 and English translation thereof; 10 pgs.
Notice of Allowance in Korean Patent Application No. 10-2020-7027229 dated Mar. 26, 2021; 5 pgs.
Office Action in European Patent Application No. 16 889 727.0 dated Apr. 28, 2021, 4 pgs.
Notice of Allowance in Japanese Patent Application No. 2016-021940 dated May 25, 2021; 5 pgs.
Office Action in Chinese Patent Application No. 202010766745.4 dated Jul. 21, 2021; 5 pgs.
Notice of Allowance in European Patent Application No. 16889727.0 dated Sep. 29, 2021; 5 pgs.
Office Action in Taiwanese Patent Application No. 110102961 dated Nov. 24, 2021 with English summary; 6 pgs.

\* cited by examiner

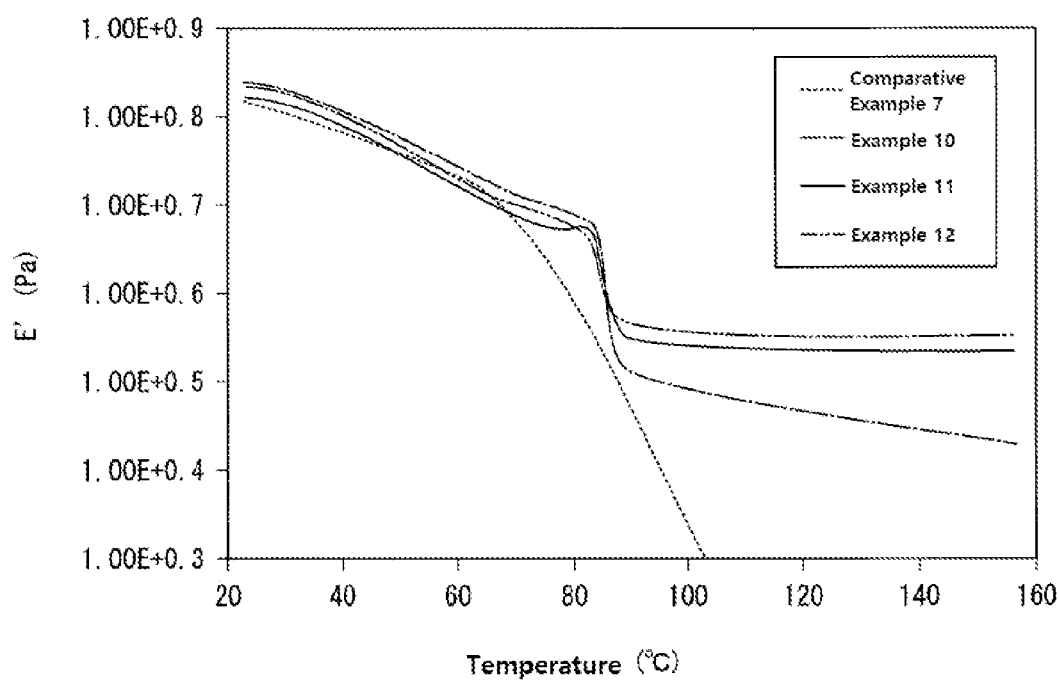

ADHESIVE RESIN COMPOSITION, METHOD FOR BONDING ADHERENDS, AND ADHESIVE RESIN FILM

CROSS REFERENCE TO RELATED APPLICATION

This Application is a National Phase of PCT/IB2016/001741 filed on Dec. 12, 2016, which, in turn, claimed the priority of Japanese Patent Application No. 2016-021940 which was filed on Feb. 8, 2016.

TECHNICAL FIELD

The present invention relates to an adhesive resin composition having excellent adhesiveness to various adherends, particularly, resin and metal, a method for bonding adherends using the relevant adhesive resin composition, and an adhesive resin film.

The present application claims the priority based on Japanese Patent Application No. 2016-021940 filed on Feb. 8, 2016, the content of which is incorporated herein by reference.

BACKGROUND TECHNOLOGY

Heretofore, as a material that adheres to an adherend such as resin or metal, an adhesive resin composition having an acid-modified polyolefin resin has been known.

For example, Patent Document 1 discloses an adhesive resin composition for a polyolefin multilayer film, which contains a dibasic carboxylic anhydride-modified polyolefin resin having a weight average molecular weight of 15,000 to 150,000 and a solid content acid value of 100 to 300.

Patent Document 1 describes that by using the relevant composition, good adhesiveness to an organic or inorganic material such as resin or metal can be obtained. Certainly, when the adhesive resin composition containing, as a sole essential component, an acid-modified polyolefin resin as described in Patent Document 1 is used, it is possible to improve adhesion between an adhesive layer including the adhesive resin composition and an adherend depending on conditions. However, there has been a problem that when a metal adherend is laminated through the relevant adhesive layer, the durability may be inferior.

Additionally, the adhesive resin composition described in Patent Document 1 does not contain an organic solvent, and is formed into an adhesive layer by coextrusion molding with an underlayer film. In extrusion molding, since an amount of resin to be discharged is limited when a stable film is formed, there is a limitation in thinning of a laminate including the relevant adhesive layer. In formation of an adhesive layer, it becomes possible to form an adhesive layer with a smaller thickness by selecting application in place of extrusion molding. For that reason, a solvent-based adhesive resin composition that can form an adhesive layer by application has been also demanded.

However, heretofore, a solvent-based adhesive resin composition having excellent adhesiveness to various adherends such as metal, glass, and plastics, as well as durability has not been known.

DOCUMENTS OF RELATED ART

Patent Document

Patent Document 1: Japanese Unexamined Patent Application, First Publication No. 2012-001661

SUMMARY OF THE INVENTION

Problem to be Solved by the Invention

The present invention has been made in view of the above-mentioned present situation, and an object thereof is to provide a solvent-based adhesive resin composition having excellent adhesiveness to various adherends such as metal, glass, and plastics, as well as durability, a method for bonding adherends, and an adhesive resin film.

Means for Solving the Problem

In order to solve the above-mentioned problems, the present invention has adopted the following constituent features.

[1] An adhesive resin composition in a first aspect of the present invention comprises more than 50 parts by mass and 99.5 parts by mass or less in a solid content of an acid-modified polyolefin resin (A) having a melting point of 50 to 100° C., 0.5 parts by mass or more and less than 50 parts by mass in a solid content of an epoxy resin (B) having a novolac structure, and an organic solvent (C).

[2] It is preferable that the adhesive resin composition of the first aspect contains 70 parts by mass or more and 99.5 parts by mass or less in a solid content of the acid-modified polyolefin resin (A), and 0.5 parts by mass or more and 30 parts by mass or less in a solid content of the epoxy resin (B) having a novolac structure.

[3] In the first aspect, it is preferable that the acid-modified polyolefin resin (A) has a methyl group and an ethyl group on a side chain.

[4] In the first aspect, it is preferable that in dynamic viscoelasticity measurement, an adhesive resin film formed including the adhesive resin composition has a storage modulus value at 60° C. of $1.0 \times 10^6$ or more and a storage modulus value at 150° C. of $1.0 \times 10^4$ or more.

[5] A method for bonding adherends in a second aspect of the present invention comprises forming an adhesive layer on a first adherend by applying the adhesive resin composition of the first aspect and drying, and then bonding a second adherend to the adhesive layer by laminating the second adherend on the adhesive layer.

[6] In the second aspect, it is preferable that after the bonding between the adhesive layer and the second adherend, aging treatment is performed by heating at 40 to 90° C. for 1 to 5 days.

[7] An adhesive resin film in a third aspect of the present invention is an adhesive resin film comprising a first adhesive layer, a substrate layer, and a second adhesive layer in that order, wherein any one or both of the first adhesive layer and the second adhesive layer include(s) the adhesive resin composition of the first aspect.

[8] An adhesive resin film in a fourth aspect of the present invention is an adhesive resin film comprising a first surface layer, a first adhesive layer, a substrate layer, a second adhesive layer, and a second surface layer in that order, wherein any one or both of the first surface layer and the second surface layer is(are) a laminate layer containing an acid-modified polyolefin resin, and any one or both of the first adhesive layer and the second adhesive layer include(s) the adhesive resin composition of the first aspect.

[9] In the fourth aspect, it is preferable that the laminate layer further contains a compound having an epoxy group or an oxazoline group, in addition to the acid-modified polyolefin resin, and a ratio of the compound having an epoxy group or an oxazoline group is 1 to 20% by mass with respect to the acid-modified polyolefin resin.

Effects of Invention

The present invention can provide an adhesive resin composition having excellent adhesiveness to various adherends such as metal, glass, and plastics, as well as durability, a method for bonding adherends, and an adhesive resin film.

BRIEF DESCRIPTION OF THE DRAWINGS

FIG. 1 is a diagram showing a storage modulus of an adhesive resin film in each of Examples 10 to 12 and Comparative Example 7.

BEST MODE FOR CARRYING OUT THE INVENTION

The present invention will be described below based on preferred embodiments.
[Adhesive Resin Composition]
An adhesive resin composition in a first aspect of the present invention contains more than 50 parts by mass and 99.5 parts by mass or less in a solid content of an acid-modified polyolefin resin (A) having a melting point of 50 to 100° C., 0.5 parts by mass or more and less than 50 parts by mass in a solid content of an epoxy resin (B) having a novolac structure, and an organic solvent (C).

Hereinafter, the acid-modified polyolefin resin (A) may be referred to as "(A) component", the epoxy resin (B) having a novolac structure may be referred to as "(B) component", and the organic solvent (C) may be referred to as "(C) component".
(Acid-Modified Polyolefin Resin (A))
In the present invention, the acid-modified polyolefin resin (A) is a polyolefin-based resin modified with an unsaturated carboxylic acid or a derivative thereof, and has an acid functional group such as a carboxy group or a carboxylic anhydride group in the polyolefin-based resin.

The (A) component is obtained by modification of a polyolefin-based resin with an unsaturated carboxylic acid or a derivative thereof, copolymerization of an acid functional group-containing monomer and olefins, or the like. Inter alia, as the (A) component, a component obtained by acid-modifying the polyolefin-based resin is preferable.

An example of the acid-modifying method includes graft modification of melting and kneading a polyolefin resin and an acid functional group-containing monomer, in the presence of a radical polymerization initiator such as an organic peroxide or an aliphatic azo compound.

Examples of the above-mentioned polyolefin-based resin include polyethylene, polypropylene, poly-1-butene, polyisobutylene, a copolymer of propylene and ethylene, a copolymer of propylene and an olefin-based monomer, and the like.

Examples of the above-mentioned olefin-based monomer subjected to copolymerization include 1-butene, isobutylene, 1-hexene, and the like.

The copolymer may be a block copolymer or may be a random copolymer.

Inter alia, as the polyolefin-based resin, a polypropylene-based resin polymerized using propylene as a raw material, such as homopolypropylene (propylene homopolymer), a copolymer of propylene and ethylene, and a copolymer of propylene and butene, is preferable, and particularly, a propylene-1-butene copolymer, that is, a polyolefin resin having a methyl group and an ethyl group on a side chain is preferable. By containing 1-butene, the molecular motion when the relevant resin is heated is promoted, and an opportunity that crosslinking points between the (A) component and the (B) component are brought into contact with each other increases, and as a result, adhesion to an adherend is more improved.

The above-mentioned acid functional group-containing monomer is a compound having an ethylenic double bond and a carboxy group or a carboxylic anhydride group in the same molecule, and examples thereof include various unsaturated monocarboxylic acids, dicarboxylic acids or acid anhydrides of dicarboxylic acids.

Examples of the acid functional group-containing monomer having a carboxy group (carboxy group-containing monomer) include α,β-unsaturated carboxylic acid monomers such as acrylic acid, methacrylic acid, maleic acid, nadic acid, fumaric acid, itaconic acid, citraconic acid, crotonic acid, isocrotonic acid, tetrahydrophthalic acid, and endo-bicyclo[2.2.1]-5-heptene-2,3-dicarboxylic acid (endic acid).

Examples of the acid functional group-containing monomer having a carboxylic anhydride group (carboxylic anhydride group-containing monomer) include unsaturated dicarboxylic anhydride monomers such as maleic anhydride, nadic anhydride, itaconic anhydride, citraconic anhydride, and endic anhydride.

One kind of these acid functional group-containing monomers may be used alone, or two or more of them may be used in combination in the (A) component.

Inter alia, as the acid functional group-containing monomer, a monomer containing an acid functional group that reacts well with the epoxy group in the (B) component described later is preferable, and due to high reactivity with the epoxy group, an acid functional group-containing monomer having an acid anhydride group is more preferable, a carboxylic anhydride group-containing monomer is further preferable, and maleic anhydride is particularly preferable.

When a part of the acid functional group-containing monomer used in acid modification is unreacted, it is preferable to use, as the (A) component, a component from which the unreacted acid functional group-containing monomer has been removed in advance in order to prevent reduction in adhesiveness due to the unreacted acid functional group-containing monomer.

In the (A) component, it is preferable that the polyolefin resin or the component derived from olefins is 50 parts by mass or more based on the total amount of 100 parts by mass of the (A) component.

In the adhesive resin composition of the present invention, the (A) component has a melting point of 50 to 100° C., preferably 60 to 98° C., more preferably 70 to 98° C., and further preferably 75 to 95° C.

When the melting point of the (A) component is set to not lower than the above-mentioned lower limit value, the heat resistance of the adhesive layer including the adhesive resin composition is improved, and as a result, heat resistance and durability after bonding of the adhesive layer and an adherend can be improved.

Meanwhile, when the melting point of the (A) component is set to not higher than the above-mentioned upper limit value, the (A) component is easily soluble in the (C) component, and as a result, a more uniform adhesive resin composition is obtained, and the (A) component and the (B) component can react with each other well to improve adhesiveness and durability. Additionally, by using the (A) component having a melting point not higher than the above-mentioned upper limit value, the temperature when thermocompression bonding with an adherend is performed using the adhesive resin film formed by the relevant adhesive resin composition, and the aging temperature after the thermocompression bonding can be relatively low. As a result, it is possible to widen the selection of an adherend material to be bonded using the relevant adhesive resin film A molecular weight of the (A) component is not particularly limited as long as the (A) component has the above-mentioned melting point, and generally, a resin having a molecular weight of 10,000 to 800,000 is used, and the molecular weight is preferably 50,000 to 650,000, more preferably 80,000 to 550,000, and further preferably 100,000 to 450,000.

Inter alia, as the (A) component, maleic anhydride-modified polypropylene is preferable from the viewpoint of solubility in the (C) component described later, the above-mentioned melting point, adhesiveness, durability, and the like.

(Epoxy Resin (B) Having Novolac Structure)

The (B) component is an epoxy resin having a novolac structure. In the adhesive resin composition of the present invention, by containing the (B) component, a crosslinked structure formed with the relevant adhesive resin composition becomes more compact and the adhesiveness to an adherend and the durability are further improved.

The (B) component has a novolac structure at least in part of the structure thereof. Furthermore, examples of the resin having an epoxy group include, but are not particularly limited to, a phenol novolac-type epoxy resin and the like.

The phenol novolac-type epoxy resin in the present invention refers to a compound having, as a basic structure, a phenol novolac resin obtained by acid condensation of phenol and formaldehyde, in which an epoxy group is introduced into part of the structure thereof. An introduction amount of the epoxy group per molecule in the phenol novolac-type epoxy resin is not particularly limited; however, a large number of epoxy groups are introduced into phenolic hydroxy groups existing in great number in the phenol novolac resin due to reaction of an epoxy group raw material such as epichlorohydrin with the phenol novolac resin, so that the compound is usually a polyfunctional epoxy resin.

Inter alia, as the phenol novolac-type epoxy resin, a bisphenol A novolac-type epoxy resin having a phenol novolac structure as a basic skeleton and also having a bisphenol A structure is preferable. In addition, the bisphenol A structure in the epoxy resin may be a structure which can be derived from bisphenol A, and hydroxy groups at both ends of bisphenol A may be substituted with a group such as an epoxy group-containing group.

One example of the bisphenol A novolac-type epoxy resin includes a resin represented by the following general formula (1);

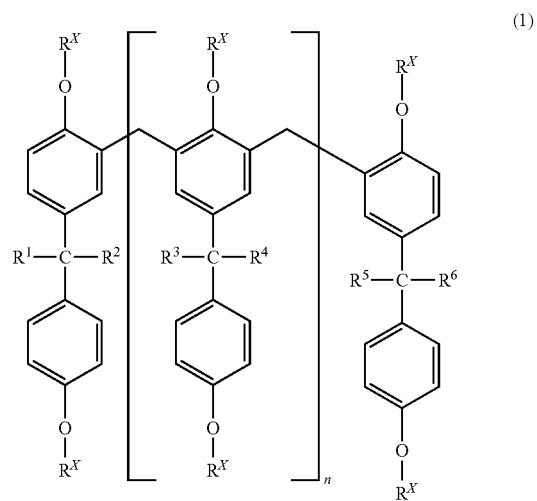

wherein, $R^1$ to $R^6$ each are independently a hydrogen atom or a methyl group, n is an integer of 0 to 10, and $R^X$ is a group having an epoxy group.

In the formula (1), $R^1$ to $R^6$ each are independently a hydrogen atom or a methyl group. When n is an integer of 2 or more, $R^3$ and $R^4$ may be the same or different.

It is preferable that the resin represented by the formula (1) satisfies at least any one of the following (i) to (iii):
(i) both of $R^1$ and $R^2$ are a methyl group;
(ii) both of $R^3$ and $R^4$ are a methyl group; and
(iii) both of $R^5$ and $R^6$ are a methyl group.

For example, when the formula (1) satisfies the above-mentioned (i), the formula (1) includes a structure in which the carbon atom to which $R^1$ and $R^2$ are bound and the two hydroxyphenyl groups to which the relevant carbon atom is bound are derived from bisphenol A.

In the formula (1), $R^X$ is a group having an epoxy group. Examples of the group having an epoxy group include an epoxy group, a combination of an epoxy group and an alkylene group, and the like, and inter alia, a glycidyl group is preferable.

The bisphenol A novolac-type epoxy resin has an epoxy equivalent of preferably 100 to 300, and more preferably 200 to 300. The epoxy equivalent (g/eq) is a molecular weight of an epoxy resin per epoxy group, and means that as this value is smaller, the number of epoxy groups in the resin is larger. By using an epoxy resin having a relatively small epoxy equivalent, the adhesiveness between the epoxy resin and an adherend is favorable, and the epoxy resin is crosslinked well with the above-mentioned acid-modified polyolefin resin, even when an addition amount of the epoxy resin is relatively small.

As such a phenol novolac-type epoxy resin, commercial products such as jER154, jER157S70, and jER-157S65 manufactured by Mitsubishi Chemical Corporation, and EPICLON N-730A, EPICLON N-740, EPICLON N-770, and EPICLON N-775 manufactured by DIC CORPORATION (the above is all product names) can also be used.

It is thought that, by using the above-mentioned epoxy resin, both the acid functional group of the above-mentioned (A) component and the epoxy group of the (B) component may function as an adhesive functional group to an adherend (particularly, a functional group such as a hydroxy group included in the adherend), so that excellent adhesiveness can be exerted.

Additionally, it is thought that part of the acid functional group of the above-mentioned (A) component reacts with part of the epoxy group of the (B) component, a crosslinked structure of the (A) component and the (B) component is formed, and as a result, this crosslinked structure reinforces the strength of the adhesive resin, and excellent adhesiveness together with good durability is obtained.

(Organic Solvent (C))

The adhesive resin composition of the present invention contains the organic solvent (C).

An adhesive resin composition in a liquid state obtained by dissolving the above-mentioned (A) component and (B) component in the (C) component can be formed into an adhesive layer with a smaller thickness in the adhesive layer formation by selecting application in place of extrusion molding. Accordingly, the adhesive layer can be made thin and a laminate including the adhesive layer can be made thin as a whole. The "liquid state" mentioned in the present invention refers to a state where the liquid state is kept in a temperature range of −5 to 50° C., preferably in a temperature range of 0 to 40° C. That is, the liquid state can be maintained in the entire area of these temperature ranges.

Additionally, the adhesive resin composition can be made to have the composition suitable for dry lamination. By applying such an adhesive resin composition in a liquid state onto a layer serving as an underlayer, followed by drying, an adhesive layer can be formed and bonding is possible by dry lamination.

The (C) component is not particularly limited as long as the (C) component can suitably dissolve the above-mentioned (A) component and (B) component, and an optional component that is used as necessary (details will be described later) to give a uniform solution, and any solvent can be used among solvents known as solution-type adhesive solvents. Additionally, the adhesive resin composition of the present invention can be used by being applied onto an adherend, and thereafter, volatilizing the (C) component under heating or the like. For that reason, from the viewpoint of facilitating volatilization, the (C) component is preferably an organic solvent having a boiling point of 150° C. or lower.

Examples of the (C) component include specifically aromatic solvents such as toluene, xylene, anisole, ethyl benzyl ether, cresyl methyl ether, diphenyl ether, dibenzyl ether, phenetole, butyl phenyl ether, ethylbenzene, diethylbenzene, pentylbenzene, isopropylbenzene, cymene, and mesitylene; aliphatic solvents such as n-hexane; ketone-based solvents such as methyl ethyl ketone, acetone, cyclohexanone, methyl-n-pentyl ketone, methyl isopentyl ketone, and 2-heptanone; ester-based solvents such as methyl lactate, ethyl lactate, methyl acetate, ethyl acetate, butyl acetate, methyl pyruvate, ethyl pyruvate, methyl methoxypropionate, and ethyl ethoxypropionate; alcohol-based solvents such as methanol, ethanol, and isopropyl alcohol; polyhydric alcohol-based solvents such as ethylene glycol, diethylene glycol, propylene glycol, and dipropylene glycol; and the like.

One kind of the (C) component may be used alone, or two or more kinds may be combined to be used as a mixed solvent. When the (C) component is used as the mixed solvent, it is also preferable that an organic solvent that dissolves the (A) component well is combined with an organic solvent that dissolves the (B) component well to be used. As such a combination, a combination of toluene that dissolves the (A) component well and methyl ethyl ketone that dissolves the (B) component well is preferable. When the mixed solvent is used, after two or more organic solvents are mixed in advance, the above-mentioned (A) component, (B) component, and the like may be dissolved, or after each component of the (A) component and the (B) component is dissolved in each good solvent, a plurality of organic solvents that have dissolved each component may be mixed.

When a plurality of organic solvents is used by being mixed, a ratio of each organic solvent is not particularly limited, and for example, when toluene and methyl ethyl ketone are used in combination, a ratio of mixing them is preferably toluene:methyl ethyl ketone=60:40 to 95:5 (ratio by mass), and more preferably toluene:methyl ethyl ketone=70:30 to 90:10 (ratio by mass).

(Optional Component)

The adhesive resin composition of the present invention may further contain other component, in addition to the above-mentioned (A) component, the (B) component, and the (C) component. Examples of the other component include additives having miscibility, additional resins, and the like, and more specifically, catalysts, crosslinking agents, plasticizers, stabilizers, coloring agents, and the like can be used.

In the solid content of the adhesive resin composition of the present invention, the (A) component is contained in an amount of more than 50 parts by mass and 99.5 parts by mass or less and the (B) component is contained in an amount of 0.5 parts by mass or more and less than 50 parts by mass. That is, in the solid content of the adhesive resin composition of the present invention, more than a half amount in a ratio by mass is the (A) component, and the adhesive resin composition of the present invention contains the (A) component as a main component. More preferably, the (B) component is contained in an amount of 0.5 to 30 parts by mass with respect to 70 to 99.5 parts by mass of the (A) component, further preferably, the (B) component is contained in an amount of 2 to 20 parts by mass with respect to 80 to 98 parts by mass of the (A) component, and particularly preferably, the (B) component is contained in an amount of 5 to 10 parts by mass with respect to 90 to 95 parts by mass of the (A) component.

Additionally, even when the adhesive resin composition of the present invention contains, as an optional component, a solid component other than the (A) component and the (B) component, the (A) component is necessarily a main component. For that reason, even when the adhesive resin composition contains an optional component, the (A) component exceeds 50 parts by mass in the total solid content of the adhesive resin composition. An example of such an adhesive resin composition includes an adhesive resin composition containing, in the total solid content, 70 to 99.5 parts by mass of the (A) component, 0.5 to 29.5 parts by mass of the (B) component, and 0.5 to 29.5 parts by mass of the other component.

A use amount of the (C) component in the adhesive resin composition of the present invention is not particularly limited as long as the use amount is an amount at which each component of the (A) component, the (B) component, the optional component, and the like can be dissolved well, and generally, the solid content concentration is preferably 3 to 30% by mass, more preferably 5 to 25% by mass, and further preferably 10 to 20% by mass.

In dynamic viscoelasticity measurement, it is preferable that the adhesive resin film (adhesive layer) formed including the adhesive resin composition of the present invention has a storage modulus value at 60° C. of $1.0 \times 10^6$ or more, and a storage modulus value at 150° C. of $1.0 \times 10^4$ or more. More specifically, it is more preferable that the storage modulus value at 60° C. is $1.0 \times 10^6$ to $1.0 \times 10^8$ Pa, and the storage modulus value at 150° C. is $1.0 \times 10^4$ to $1.0 \times 10^8$ Pa.

That is, the storage modulus value at 150° C. is preferably 1/10,000 to 1/1, more preferably 1/1,000 to 1/1, further preferably 1/500 to 1/1, and particularly preferably 1/100 to 1/1, relative to the storage modulus value at 60° C.

That is, it is preferable that the adhesive resin composition of the present invention not only has a sufficient modulus at 60° C., but also has a modulus not too low and can maintain a modulus in a moderate range at 150° C.

According to the adhesive resin composition of the present invention having the (A) component and the (B) component as described above, when the acid functional group of the (A) component is crosslinked with the epoxy group of the (B) component, the modulus is maintained even at a relatively high temperature, and the shape of the layer including the adhesive resin composition (adhesive layer) is not changed and is maintained favorably. As a result, the shape, adhesiveness, and the like of the adhesive resin film having the relevant adhesive layer are also retained favorably, and it is possible to obtain an adhesive resin film having high temperature resistance.

The storage modulus value in dynamic viscoelasticity measurement can be measured, for example, as follows.

First, the adhesive resin composition of the present invention is applied onto a substrate not subjected to bonding such as a fluorine resin, and the substrate is heated and dried at 110° C. for 300 seconds (the organic solvent is completely volatilized), and is subjected to aging treatment at 80° C. for 3 days (crosslinking is completed). Thereafter, the substrate is peeled, so that an adhesive layer (adhesive resin film) having a thickness of 0.3 mm is formed. The formed adhesive resin film is subjected to measurement with a known dynamic viscoelasticity measuring apparatus, so that a storage modulus can be measured. As the dynamic viscoelasticity measuring apparatus, a dynamic viscoelasticity measuring apparatus "RSA-3" (product name) from TA Instruments and the like can be used. A vibration frequency at the measurement of the storage modulus is, for example, 1 Hz. The adhesive in the present invention has a storage modulus at 60° C. of preferably $1.0\times10^6$ to $1.0\times10^8$, and further preferably $5.0\times10^6$ to $5.0\times10^7$. From the viewpoint of adhesiveness and durability, the storage modulus at 150° C. is preferably $1.0\times10^4$ to $1.0\times10^7$, further preferably $5.0\times10^4$ to $9.5\times10^5$, and most preferably $3.0\times10^5$ to $8.0\times10^5$.

[Method for Bonding Adherends]

A method for bonding adherends in a second aspect of the present invention is a method of bonding an adherend using the above-mentioned adhesive resin composition of the first aspect, the method including forming an adhesive layer on a first adherend by applying the above-mentioned adhesive resin composition of the first aspect and drying, and bonding a second adherend to the above-mentioned adhesive layer by laminating the second adherend on the above-mentioned adhesive layer.

Materials for the first adherend and the second adherend are not particularly limited as long as they have sufficient mechanical strength and heat resistance. For example, a resin film composed of polyethylene naphthalate (PEN), polyethylene terephthalate (PET), polybutylene terephthalate (PBT), a cyclic olefin polymer (COP), a methylpentene polymer (TPX), polyimide (PI) or the like; a plate of metal (metal foil) such as iron, copper, aluminum, lead, zinc, titanium, and chromium; a plate of alloy (alloy plate foil) such as stainless steel; a glass plate; and the like can be used.

The first adherend and the second adherend may be composed of the same material, or may be composed of different materials. A thickness of the first adherend and the second adherend is not particularly limited, and may be, for example, 10 to 1,000 μm.

The method of applying the adhesive resin composition of the first aspect onto the first adherend is not particularly limited, but the composition can be applied by a conventional method using a known application device such as a bar coater, a die coater or a gravure coater.

The adhesive resin composition applied onto the first adherend is dried, and at least part of the organic solvent in the adhesive resin composition is volatilized, so that the adhesive layer is formed. The drying condition may be appropriately set depending on the organic solvent to be used (the above-mentioned (C) component), and for example, the organic solvent can be volatilized by heating at a temperature of 40 to 150° C. for 5 to 600 seconds.

A thickness of the adhesive layer to be formed is appropriately determined depending on the materials and thicknesses of the first adherend and the second adherend, and is generally 0.5 to 500 μm.

It is preferable that after the second adherend is laminated on the formed adhesive layer, thermocompression bonding is performed in order to closely adhere the adhesive layer to the second adherend. As the condition of the thermocompression bonding, the condition under which the desired bonding strength is obtained may be appropriately selected. The bonding strength can be improved by raising the thermocompression bonding temperature, raising the thermocompression bonding pressure, or prolonging the thermocompression bonding. Meanwhile, when the thermocompression bonding temperature or thermocompression bonding pressure has been excessively raised, or the thermocompression bonding time has been excessively prolonged, the first adherend and/or the second adherend in the form of a resin film may thermally shrink, which may slow the processing speed to reduce the working efficiency, so that a large scale apparatus may be necessary. For that reason, it is preferable to select a suitable condition depending on the necessary bonding strength.

It is preferable that after the bonding of the adhesive layer and the second adherend by thermocompression bonding, the curing acceleration of the adhesive layer by aging treatment is performed. The temperature and time for the aging can be appropriately determined depending on the desired bonding strength, and for example, it is preferable that the aging is performed by leaving the adhesive layer to stand still for 1 to 5 days under a temperature condition of 30 to 90° C. The degree of the curing acceleration of the adhesive layer is proportional to the level of the temperature, and is proportional to the length of the treatment time. For that reason, it is preferable to appropriately adjust the temperature and time for the aging to 5 days at 30° C., one day at 90° C. or the like, depending on the desired bonding strength, the temperature admissibility of a material to be used, the required working efficiency, and the like. When an adhesive layer having high strength is required, it is preferable to elevate the temperature condition and prolong the aging treatment time.

Additionally, the temperature and time necessary for the aging treatment are inversely proportional to the content of the (B) component contained in the adhesive layer. That is, when the amount of the (B) component to be blended is large with respect to the (A) component, sufficient aging effect can be obtained at a lower temperature and/or in a shorter time since the crosslinking reaction between the (A) component and the (B) component easily progresses. On the other hand, when the amount of the (B) component to be blended is small with respect to the (A) component, aging at a higher temperature and/or for a longer time may be necessary, since the number of reaction points between the (A) component and the (B) component is little. For example, when aging at 60° C. for about 2 to 3 days is performed using 10% by mass of the (B) component with respect to the total of the (A) component and the (B) component, performance is obtained which is equivalent to the performance obtained when aging at 80° C. for about 4 to 5 days is performed using 3% by mass of the (B) component with respect to the total of the (A) component and the (B) component.

[Adhesive Resin Film]

An adhesive resin film in a third aspect of the present invention comprises a first adhesive layer, a substrate layer, and a second adhesive layer in that order, in which any one or both of the above-mentioned first adhesive layer and second adhesive layer include(s) the above-mentioned adhesive resin composition of the first aspect.

Additionally, an adhesive resin film in a fourth aspect of the present invention comprises a first surface layer, a first adhesive layer, a substrate layer, a second adhesive layer, and a second surface layer in that order, in which any one or both of the above-mentioned first surface layer and second surface layer is(are) a laminate layer containing an acid-modified polyolefin resin, and any one or both of the above-mentioned first adhesive layer and second adhesive layer include(s) the above-mentioned adhesive resin composition of the first aspect.

Each of the adhesive resin films of the third and fourth aspects is a laminate having at least one adhesive layer including the above-mentioned adhesive resin composition of the first aspect, and can be used in many utilities.

(First and Second Adhesive Layers)

At least any one of the first adhesive layer and the second adhesive layer in the third and fourth aspects includes the above-mentioned adhesive resin composition of the first aspect, and it is preferable that both of the adhesive layers include the adhesive resin composition of the first aspect. When one of the first adhesive layer and the second adhesive layer is not the adhesive layer including the adhesive resin composition of the first aspect, the relevant one of the adhesive layers can be an adhesive layer formed using an adhesive such as a known urethane-based adhesive or epoxy-based adhesive.

(Substrate Layer)

The substrate layer in the third and fourth aspects is not particularly limited as long as the substrate layer has sufficient mechanical strength, and the same substrate layer as the first adherend or the second adherend described above in the description of the second aspect can be used.

Inter alia, a film composed of PEN, PET, TPX, PI or the like is preferable, and a PEN film is particularly preferable, since the film has a low linear expansion coefficient and hardly causes interlayer peeling when an adherend such as metal is bonded using the relevant adhesive resin film.

By using a resin having a low linear expansion coefficient, generation of strain, which is caused by temperature, of the laminate including the relevant adhesive resin film, particularly, the laminate in which a metal adherend and an adhesive resin film are bonded, is reduced.

When the substrate layer is a resin film, it is preferable that the relevant resin film contains a particulate or fibrous filler as an additive. The filler may be a filler having high heat resistance, and examples thereof include an organic filler, an inorganic filler, and the like. By adding the filler, a shrinkage force of the adhesive resin film can be further suppressed, and the strength of the adhesive resin film itself can also be enhanced. Inter alia, the heat resistance and shrinking property of the substrate layer are particularly improved, so that it is preferable to add an inorganic filler.

Examples of the inorganic filler include carbonates such as calcium carbonate, magnesium carbonate, and barium carbonate; sulfates such as calcium sulfate, magnesium sulfate, and barium sulfate; chlorides such as sodium chloride, calcium chloride, and magnesium chloride; oxides such as aluminum oxide, calcium oxide, magnesium oxide, zinc oxide, titanium oxide, and silica; minerals such as talc, smectite, mica, and kaolinite; carbon compounds such as carbon fibers and carbon particles; and fine particles composed of glass.

Examples of the shape of the filler include a spherical shape, a rod shape, a plate shape, and the like, and a plate-shaped filler is preferable.

(First and Second Surface Layers)

Any one or both of the first surface layer and the second surface layer in the fourth aspect is(are) a laminate layer containing an acid-modified polyolefin resin, and it is preferable that both of the surface layers are laminate layers containing an acid-modified polyolefin resin.

Acid-Modified Polyolefin Resin

As the acid-modified polyolefin resin of the fourth aspect, the same resin as the acid-modified polyolefin resin mentioned as the acid-modified polyolefin resin (A) in the first aspect can be used, and maleic anhydride-modified polypropylene is preferable.

It is preferable that in addition to the acid-modified polyolefin resin, the first surface layer and the second surface layer further contain a compound having an epoxy group or a compound having an oxazoline group.

Compound Having Epoxy Group

The compound having an epoxy group is not particularly limited as long as the compound is a compound having one or more epoxy groups in one molecule, and examples thereof include phenoxy resins synthesized from bisphenols and epichlorohydrin; phenol novolac-type epoxy resins; bisphenol-type epoxy resins; and the like. As the phenol novolac-type epoxy resin, the phenol novolac-type epoxy resin described above in the first aspect (for example, the compound represented by the above-mentioned formula (1)) can be used.

Compound Having Oxazoline Group

The compound having an oxazoline group in the present invention is a compound having an oxazoline group (monovalent group having a bond at a 2-position of an oxazoline ring ($C_3H_5NO$)) in the structure. When the compound used together with the acid-modified polyolefin resin has an oxazoline group, the oxazoline group reacts with an acid functional group (for example, a carboxy group, a carboxylic acid group or the like) of the acid-modified polyolefin resin to form a crosslinked structure.

Examples of the compound having an oxazoline group include specifically oxazoline group-containing styrene-based resins. For example, in the case where the acid functional group is a carboxy group, the following crosslinking reaction occurs, and an amide ester bond is formed. As a result, this crosslinked structure reinforces the strength of the resin, and excellent adhesiveness together with good durability is obtained.

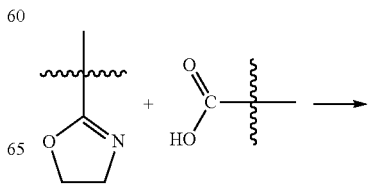

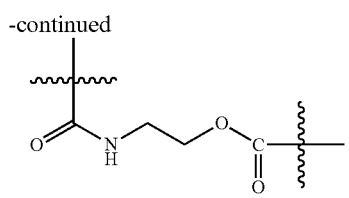

Inter alia, as the compound having an oxazoline group, a resin obtained by copolymerizing a styrene-based monomer with an oxazoline group-containing monomer is preferable.

As the styrene-based monomer, styrene and derivatives thereof can be used. Examples thereof include specifically styrene; alkylstyrenes such as α-methylstyrene, methylstyrene, dimethylstyrene, trimethylstyrene, ethylstyrene, diethylstyrene, triethylstyrene, propylstyrene, butylstyrene, hexylstyrene, heptylstyrene, and octylstyrene; halogenated styrenes such as chlorostyrene, fluorostyrene, bromostyrene, dibromostyrene, and iodostyrene; and the like. Inter alia, styrene is preferable.

A skeleton of the oxazoline group-containing monomer is not particularly limited as long as the oxazoline group-containing monomer is a monomer that contains an oxazoline group and is copolymerizable with the styrene-based monomer, and a monomer having an oxazoline group and a vinyl group can suitably be used.

Examples of the oxazoline group-containing vinyl monomer include 2-vinyl-2-oxazoline, 5-methyl-2-vinyl-2-oxazoline, 4,4-dimethyl-2-vinyl-2-oxazoline, 2-isopropenyl-2-oxazoline, 4,4-dimethyl-2-isopropenyl-2-oxazoline, 4-acryloyl-oxymethyl-2,4-dimethyl-2-oxazoline, 4-methacryloyloxymethyl-2,4-dimethyl-2-oxazoline, 4-methacryloyloxymethyl-2-phenyl-4-methyl-2-oxazoline, 2-(4-vinylphenyl)-4,4-dimethyl-2-oxazoline, 4-ethyl-4-hydroxymethyl-2-isopropenyl-2-oxazoline, 4-ethyl-4-carboethoxymethyl-2-isopropenyl-2-oxazoline, and the like. Inter alia, 2-isopropenyl-2-oxazoline is preferable.

The styrene-based monomers and the oxazoline group-containing monomers may be used alone, or two or more of them may be used in combination.

Additionally, the compound having an oxazoline group may contain one or more other monomers in addition to the styrene-based monomer and the oxazoline group-containing monomer. The other monomers are not particularly limited as long as they are copolymerizable with these monomers, and examples thereof include a (meth)acrylate monomer, a (meth)acrylic ester monomer, a (meth)acrylamide monomer, and the like.

In the compound having an oxazoline group, a constitution ratio of each monomer is not particularly limited, and a resin is preferable which is obtained by copolymerizing an oxazoline group-containing monomer in an amount of 5 to 50% by mass, and more preferably 10 to 30% by mass with respect to all monomers constituting the compound having an oxazoline group. By using the oxazoline group-containing monomer in the above-mentioned range, the above-mentioned acid-modified polyolefin resin can be sufficiently crosslinked with the compound having an oxazoline group to obtain good durability.

The compound having an oxazoline group has a number average molecular weight of preferably 30,000 to 250,000, more preferably 50,000 to 200,000, further preferably 60,000 to 100,000, and most preferably 60,000 to 80,000. By using the compound having an oxazoline group in which the number average molecular weight is within the above-mentioned range, compatibility between the acid-modified polyolefin resin and the compound having an oxazoline group is improved, and it becomes possible to sufficiently crosslink the acid-modified polyolefin resin with the compound having an oxazoline group.

As such a compound having an oxazoline group, commercial products such as EPOCROS RPS-1005 (product name) manufactured by NIPPON SHOKUBAI CO., LTD. can be used.

In the first surface layer and the second surface layer, the compound having an epoxy group or an oxazoline group is contained in an amount of preferably 1 to 20 parts by mass, more preferably 1 to 10 parts by mass, and further preferably 1 to 5 parts by mass, with respect to the acid-modified polyolefin resin.

The first and second surface layers can optionally contain additives having miscibility, additional resins, plasticizers, stabilizers, coloring agents, and the like appropriately.

The adhesive resin film of the third aspect can be produced, for example, as follows. Compositions forming the first adhesive layer and the second adhesive layer (at least any one of them is the adhesive resin composition of the first aspect, and it is preferable that both of them are the adhesive resin composition of the first aspect) are sequentially or simultaneously applied on both sides of the substrate layer, and thereafter, the relevant compositions are dried to volatilize at least part of the organic solvent, so that the first adhesive layer and the second adhesive layer are formed. The first adhesive layer and the second adhesive layer can be each formed in a similar manner to the adhesive layer described in the second aspect.

Additionally, the adhesive resin film of the fourth aspect can be produced, for example, as follows.

First, in a similar manner to the third aspect, the adhesive resin film comprising the first adhesive layer, the substrate layer, and the second adhesive layer in that order is formed. Then, a first surface layer and a second surface layer are respectively laminated to be bonded on the formed first adhesive layer and second adhesive layer. The first surface layer and the second surface layer may be formed on the first adhesive layer and the second adhesive layer by application, or may be formed as a film in advance. Bonding of the first adhesive layer and the first surface layer, and bonding of the second adhesive layer and the second surface layer can be each performed in a similar manner to the bonding of the adhesive layer and the second adherend described in the second aspect. Specifically, it is preferable that the bonding is performed through the thermocompression bonding and the aging treatment as described above.

As the thickness of each layer in the adhesive resin film, the thickness of the first adhesive layer and the thickness of the second adhesive layer are each preferably 0.5 to 500 μm, and more preferably 5 to 50 μm. The thickness of the substrate layer is preferably 20 to 1,000 μm, and more preferably 50 to 200 μm. Additionally, the thickness of the first surface layer and the thickness of the second surface layer are each preferably 5 to 200 μm in the case of being formed into a film in advance by extrusion or the like, and are each preferably 0.5 to 100 μm in the case of being produced by solution application.

EXAMPLES

The present invention will be described in further detail below by way of examples, but the present invention is not limited by these examples.

Examples 1 to 9 and Comparative Examples 1 to 6

(Adhesive Resin Film)

Using each component shown in Table 1, an adhesive resin composition of each example was obtained. Specifically, a solution in which the (A) component was dissolved in toluene as the (C) component, and a solution in which the (B) component was dissolved in methyl ethyl ketone as the (C) component were prepared, and these solutions were mixed. In Comparative Example 3 in which the (B) component was not contained, only methyl ethyl ketone not containing the (B) component was mixed with the toluene solution containing the (A) component.

(C)-1: Mixed solvent of toluene/methyl ethyl ketone=80/20 (ratio by mass)

(Measurement of Storage Modulus)

The measurement is in accordance with JIS K7244 "Plastics-Determination of Dynamic Mechanical Properties".

First, the adhesive resin composition of the present invention was applied onto a substrate not subjected to bonding such as a fluorine resin, and the substrate was heated and dried at 110° C. for 300 seconds (the organic solvent was completely volatilized), and was subjected to aging treatment at 80° C. for 3 days (crosslinking was completed). Thereafter, the substrate was peeled, so that an adhesive layer (adhesive resin film) having a thickness of 0.3 mm, a

TABLE 1

| | (A) Component | (B) Component | (C) Component | Storage Modulus (Pa) 60° C. | Storage Modulus (Pa) 150° C. | Monolayer Adhesiveness | Trilayer Durability | Pentalayer Durability |
|---|---|---|---|---|---|---|---|---|
| Example 1 | (A)-1 [99.5] | (B)-1 [0.5] | (C)-1 [600] | $2.0 \times 10^7$ | $5.0 \times 10^4$ | 1 | B | B | B |
| Example 2 | (A)-1 [95.0] | (B)-1 [5.0] | (C)-1 [600] | $2.0 \times 10^7$ | $4.2 \times 10^5$ | 1 | A | A | A |
| Example 3 | (A)-1 [90.0] | (B)-1 [10.0] | (C)-1 [600] | $2.0 \times 10^7$ | $5.0 \times 10^5$ | 1 | A | A | A |
| Example 4 | (A)-1 [70.0] | (B)-1 [30.0] | (C)-1 [600] | $2.0 \times 10^7$ | $9.5 \times 10^5$ | 1 | B | B | B |
| Example 5 | (A)-1 [55.0] | (B)-1 [45.0] | (C)-1 [600] | $2.0 \times 10^7$ | $9.9 \times 10^5$ | 1 | C | C | C |
| Example 6 | (A)-2 [95.0] | (B)-1 [5.0] | (C)-1 [600] | $2.0 \times 10^7$ | $3.4 \times 10^5$ | 1 | B | B | B |
| Example 7 | (A)-3 [95.0] | (B)-1 [5.0] | (C)-1 [600] | $2.0 \times 10^7$ | $3.2 \times 10^5$ | 1 | B | B | B |
| Example 8 | (A)-4 [95.0] | (B)-1 [5.0] | (C)-1 [600] | $2.0 \times 10^7$ | $1.2 \times 10^5$ | 1 | B | B | B |
| Example 9 | (A)-5 [95.0] | (B)-1 [5.0] | (C)-1 [600] | $2.0 \times 10^7$ | $8.5 \times 10^5$ | 1 | A | B | B |
| Comparative Example 1 | (A)-1 [99.8] | (B)-1 [0.2] | (C)-1 [600] | $2.0 \times 10^7$ | $8.3 \times 10^3$ | 3 | D | D | D |
| Comparative Example 2 | (A)-1 [40.0] | (B)-1 [60.0] | (C)-1 [600] | $1.5 \times 10^7$ | $2.0 \times 10^3$ | 3 | C | D | D |
| Comparative Example 3 | (A)-1 [100.0] | — | (C)-1 [600] | $1.8 \times 10^7$ | $<1.0 \times 10^3$ | 2 | D | D | D |
| Comparative Example 4 | (A)-1 [95.0] | (B)-2 [5.0] | (C)-1 [600] | $2.0 \times 10^7$ | $<1.0 \times 10^3$ | 2 | D | D | D |
| Comparative Example 5 | (A)-6 [95.0] | (B)-1 [5.0] | (C)-1 [600] | $2.0 \times 10^7$ | $<1.0 \times 10^3$ | 3 | D | D | D |
| Comparative Example 6 | (A)-7 [95.0] | (B)-1 [5.0] | (C)-1 [600] | $2.0 \times 10^7$ | $<1.0 \times 10^3$ | 3 | D | D | D |

In Table 1, each abbreviation has the following meaning. A numerical value in [ ] is a blending amount (parts by mass).

(A)-1: Maleic anhydride-modified 1-butene-propylene copolymer (melting point 80° C.)

(A)-2: Maleic anhydride-modified polypropylene (melting point 85° C.)

(A)-3: Maleic anhydride-modified 1-butene-ethylene copolymer (melting point 80° C.)

(A)-4: Maleic anhydride-modified 1-butene-propylene copolymer (melting point 50° C.)

(A)-5; Maleic anhydride-modified 1-butene-propylene copolymer (melting point 100° C.)

(A)-6: Maleic anhydride-modified 1-butene-propylene copolymer (melting point 40° C.)

(A)-7: Maleic anhydride-modified 1-butene-propylene copolymer (melting point 120° C.)

(B)-1: "jER157S70" (product name; manufactured by Mitsubishi Chemical Corporation; phenol novolac-type epoxy resin having bisphenol A structure; viscosity=80; epoxy equivalent=210)

(B)-2: Phenoxy resin having no epoxy group, in which an epoxy group at the end was ring-opened width of 4 mm, and a length of 30 mm was formed. The formed adhesive resin film was set in a dynamic viscoelasticity measuring apparatus having a distance between chucks of 20 mm. While the temperature was raised from 20° C. to 160° C. at a temperature raising speed of 3° C./min under the atmospheric pressure, a storage modulus value (E') was obtained at a frequency of 1 Hz when 0.01% of the strain was applied.

As the dynamic viscoelasticity measuring apparatus, a dynamic viscoelasticity measuring apparatus "RSA-3" (product name) of TA Instruments was used.

(Evaluation of Monolayer Adhesiveness and Durability)

First, a stainless foil having a thickness of 100 μm was prepared. The adhesive resin composition obtained in each of the above-mentioned examples and comparative examples was applied on one side of this stainless foil at an application amount of 20 g/m², and dried at 110° C. for 1 minute to form an adhesive layer having a thickness of 2 μm.

Then, after an aluminum foil having a thickness of 100 μm was overlapped on the formed adhesive layer, sticking was performed by thermocompression bonding at 160° C.

for 3 seconds while applying a pressure of 0.4 MPa. Thereafter, aging treatment was performed at 80° C. for 3 days to obtain a laminate.

Monolayer Adhesiveness Evaluation

Evaluation was performed for the laminate of each example obtained as described above using a tensile testing machine (manufactured by NIDEC-SHIMPO CORPORATION, product name: FGS-50E-H) in accordance with the peeling measuring method A (90° direction peeling) defined in JIS C6471 "Test Methods of Copper-Clad Laminates for Flexible Printed Wiring Boards". The results of evaluation according to the following evaluation criteria are shown in Table 1 as "(Monolayer) Adhesiveness".

1: 10 N/15 mm or more.
2: 5 N/15 mm or more and less than 10 N/15 mm.
3: Less than 5 N/15 mm.

Monolayer Durability Evaluation

After the laminate of each example obtained as described above was immersed in hot water at 95° C. for 1,000 hours, evaluation was performed using a tensile testing machine (manufactured by NIDEC-SHIMPO CORPORATION; product name "FGS-50E-H") in accordance with the peeling measuring method A (90° direction peeling) defined in JIS C6471 "Test Methods of Copper-Clad Laminates for Flexible Printed Wiring Boards". The results of evaluation according to the following evaluation criteria are shown in Table 1 as "(Monolayer) Durability".

A: 10 N/15 mm or more.
B: 5 N/15 mm or more and less than 10 N/15 mm.
C: 1 N/15 mm or more and less than 5 N/15 mm.
D: Since the laminate has been completely peeled, measurement is impossible.

(Trilayer Durability Evaluation)

As a substrate film, a PEN film having a thickness of 75 μm was prepared. The adhesive resin composition obtained in each of the above-mentioned examples and comparative examples was applied on both sides of this PEN film at an application amount of 20 g/m², and dried at 110° C. for 1 minute to form an adhesive layer having a thickness of 2 pm on both sides of the PEN film. Thereafter, aging treatment was performed at 80° C. for 3 days to obtain a laminate.

Then, after a stainless foil having a thickness of 100 μm was overlapped on each of the adhesive layers on both sides of the formed laminate, sticking was performed at 160° C. for 3 seconds while applying a pressure of 0.4 MPa.

After the resulting laminate was immersed in hot water at 95° C. for 1,000 hours, observation was performed visually, and results of evaluation according to the following evaluation criteria are shown in Table 1 as "(Trilayer) Durability".

A: Peeling between layers is not recognized at all.
B: Peeling between layers is very slightly recognized, but is within a permissible range.
C: There is peeling between layers at some places.
D: Layers have been completely peeled.

(Pentalayer Durability Evaluation)

As a substrate film, a PEN film having a thickness of 75 μm was prepared. The adhesive resin composition obtained in each of the above-mentioned examples and comparative examples was applied on both sides of this PEN film at an application amount of 20 g/m², and dried at 110° C. for 1 minute to form an adhesive layer having a thickness of 2 pm on both sides of the PEN film.

Then, a surface layer having a thickness of 50 μm was formed on each of surfaces of the two adhesive layers. The surface layer is a film obtained by melting and kneading 95 parts by mass of maleic anhydride-modified polypropylene (melting point 140° C.) and 5 parts by mass of "EPOCROS RPS-1005" (product name; manufactured by NIPPON SHOKUBAI CO., LTD.; resin obtained by copolymerizing styrene and 2-isopropenyl-2-oxazoline; number average molecular weight=70,000), followed by extrusion molding.

Thereafter, after sticking was performed by thermocompression bonding at 150° C. for 1 second while applying a pressure of 1 MPa, aging treatment was performed at 80° C. for 3 days to obtain a laminate.

Then, after a stainless foil having a thickness of 100 μm was overlapped on each surface layer of both sides of the formed laminate, sticking was performed by thermocompression bonding at 160° C. for 3 seconds while applying a pressure of 0.4 MPa.

After the resulting laminate was immersed in hot water at 95° C. for 1,000 hours, evaluation was performed as in the above-mentioned "'Trilayer Durability Evaluation", and results are shown in Table 1 as "(Pentalayer) Durability".

From the results shown in Table 1, it could be confirmed that Examples 1 to 9 using the adhesive resin composition of the present invention had excellent adhesiveness and durability as compared with Comparative Examples 1 to 6.

Examples 10 to 12 and Comparative Example 7

An adhesive resin composition of each of examples and comparative example shown in Table 2 was obtained in a similar manner to Examples 1 to 9 and the described above. Each abbreviation in Table 2 is the same as the above-mentioned abbreviation of Table 1.

Thereafter, a storage modulus at 20 to 160° C. was measured in a similar manner to the above-mentioned measurement of storage modulus. The results are shown in FIG. 1.

TABLE 2

|  | (A) component | (B) component | (C) component |
| --- | --- | --- | --- |
| Example 10 | (A)-1 [99.0] | (B)-1 [1.0] | (C)-1 [600] |
| Example 11 | (A)-1 [95.0] | (B)-1 [5.0] | (C)-1 [600] |
| Example 12 | (A)-1 [90.0] | (B)-1 [10.0] | (C)-1 [600] |
| Comparative Example 7 | (A)-1 [100.0] | — | (C)-1 [600] |

From the results shown in FIG. 1, it could be confirmed that in each of Examples 10 to 12 using the adhesive resin composition of the present invention, the storage modulus (E'; unit Pa) was not reduced even at a high temperature, while in Comparative Example 7 not containing the (B) component, the storage modulus was remarkably reduced, and as a result, a shape could not be maintained.

What is claimed is:

1. An adhesive resin film comprising a first surface layer, a first adhesive layer, a substrate layer, a second adhesive layer, and a second surface layer in that order, wherein
at least one of said first surface layer and said second surface layer contains an acid-modified polyolefin resin, and
at least one of said first adhesive layer and said second adhesive layer contains an adhesive resin composition, wherein said adhesive resin composition consists essentially of:
70 parts by mass or more and 99.5 parts by mass or less of an acid-modified polyolefin resin (A) having a melting point of 50 to 100° C.;

0.5 parts by mass or more and 30 parts by mass or less of an epoxy resin (B) having a novolac structure; and an organic solvent (C), wherein said epoxy resin (B) having a novolac structure is a bisphenol A novolac epoxy resin having an epoxy equivalent of 100 to 300, and the acid-modified polyolefin resin (A) and the epoxy resin (B) having a novolac structure are the only solid components in said adhesive resin composition.

2. The adhesive resin film according to claim 1, wherein said acid- modified polyolefin resin (A) has a methyl group and an ethyl group on a side chain.

3. The adhesive resin film according to claim 1, wherein in dynamic viscoelasticity measurement, the adhesive resin film formed including said adhesive resin composition has a storage modulus value at 60° C. of $1.0\times10^6$ or more and a storage modulus value at 150° C. of $1.0\times10^4$ or more.

4. The adhesive resin film according to claim 1, wherein the at least one of said first surface layer and said second surface layer further contains a compound having an epoxy group or an oxazoline group, wherein said compound having an epoxy group or an oxazoline group is contained in an amount of 1 to 20% by mass with respect to said acid-modified polyolefin resin.

* * * * *